(12) United States Patent
Whittaker, Jr. et al.

(10) Patent No.: US 7,510,320 B2
(45) Date of Patent: Mar. 31, 2009

(54) EXTRUSION AUGER WITH REMOVABLE AUGER SEGMENTS AND REMOVAL TOOL

(75) Inventors: Charles Burton Whittaker, Jr., Cleveland, NC (US); Joey D. Bowles, Granite Quarry, NC (US)

(73) Assignee: J.C. Steele & Sons, Inc., Statesville, NC (US)

( * ) Notice: Subject to any disclaimer, the term of this patent is extended or adjusted under 35 U.S.C. 154(b) by 31 days.

(21) Appl. No.: 11/673,955

(22) Filed: Feb. 12, 2007

(65) Prior Publication Data
US 2007/0127308 A1    Jun. 7, 2007

Related U.S. Application Data

(62) Division of application No. 10/782,704, filed on Feb. 19, 2004, now Pat. No. 7,192,178.

(51) Int. Cl.
*B29B 7/58* (2006.01)
*B29B 7/80* (2006.01)
*B23P 19/04* (2006.01)

(52) U.S. Cl. ..................... 366/79; 29/402.03
(58) Field of Classification Search .................. 366/79, 366/81; 29/402.03
See application file for complete search history.

(56) References Cited

U.S. PATENT DOCUMENTS

| | | |
|---|---|---|
| 167,061 A | 8/1875 | Brockett |
| 1,101,142 A | 6/1914 | Mueller |
| 1,815,809 A | 7/1931 | Steele |
| 3,652,062 A | 3/1972 | Baker |
| 3,672,641 A | 6/1972 | Slaby |
| 3,685,865 A | 8/1972 | Young |
| 3,796,448 A | 3/1974 | Ringkamp |
| 3,846,898 A | 11/1974 | Kerr |
| 3,967,909 A | 7/1976 | Deeter et al. |
| 3,983,949 A | 10/1976 | Pozniko |
| 4,021,126 A | 5/1977 | Deeter et al. |
| 4,167,339 A | 9/1979 | Anders |
| 4,334,785 A | 6/1982 | Blach |
| 4,583,275 A | 4/1986 | Diaz |
| 4,750,571 A | 6/1988 | Geeting |
| 4,802,391 A | 2/1989 | Willhoite et al. |
| 4,821,818 A | 4/1989 | Mefferd |
| 4,838,700 A | 6/1989 | Williamson |
| 4,844,184 A | 7/1989 | Acker, III et al. |

(Continued)

*Primary Examiner*—Tony G Soohoo
(74) *Attorney, Agent, or Firm*—Alston & Bird LLP

(57) ABSTRACT

There is provided an extrusion auger having auger segments that are removable from an auger shaft and that include a recess to facilitate removal of the auger segments. A pulling tool is also provided to engage the recess of the auger segment and to facilitate the removal of auger segment from the auger shaft in an axially forward direction. The auger segment includes an access way to provide access to the recess and the recess includes an engaging surface. The pulling tool includes a flanged end that can pass through the access way of the auger segment and contact the engaging surface of the auger segment. The recess of the auger segment may be located in a bore of the auger hub such that the pulling tool can be advanced along a keyway in the auger shaft, rotated to pass the flanged end of the pulling tool through the access way, and pulled axially forward to contact the engaging surface.

9 Claims, 3 Drawing Sheets

U.S. PATENT DOCUMENTS

| | | |
|---|---|---|
| 4,864,709 A | 9/1989 | Klucz et al. |
| 4,901,635 A | 2/1990 | Williams |
| 5,055,060 A | 10/1991 | Down et al. |
| 5,058,256 A | 10/1991 | Taylor et al. |
| 5,075,960 A | 12/1991 | Smith |
| 5,314,245 A | 5/1994 | Blach |
| 5,673,543 A | 10/1997 | Richardson et al. |
| 6,216,327 B1 | 4/2001 | Hendrian |
| 6,385,834 B2 | 5/2002 | Thermos et al. |

EXTRUSION AUGER WITH REMOVABLE AUGER SEGMENTS AND REMOVAL TOOL

CROSS-REFERENCE TO RELATED APPLICATIONS

This application is a divisional application of U.S. application Ser. No. 10/782,704; filed Feb. 19, 2004, now, U.S. Pat. No. 7,192,178 which is hereby incorporated herein in its entirety by reference.

FIELD OF THE INVENTION

The present invention relates generally to extrusion augers. More particularly the invention relates to an extrusion auger having one or more auger segments that are removable from an auger shaft in an axially forward direction.

BACKGROUND OF THE INVENTION

Many industries utilize extrusion augers to mix and/or extrude the process materials during the manufacturing of a product. An auger is essentially a shaft having a spiraled flight that rotates to push or pull the process material axially along the auger. The process material is predominately moved by the flight because of the screw-like movement of the flight. In some industries, such as the brick industry, constituents of the process materials are very hard and/or abrasive such that the flight is worn during extensive use. Damaged or worn flights may require replacement or refurbishment for efficient operation of the auger.

Some extrusion augers include removable auger segments that provide for replacement of auger flights without replacing the entire auger. An auger segment consists of a hollow hub with a portion of the flight, such as a half or a complete revolution. The auger includes an auger shaft about which auger segments are axially attached along the auger shaft. When the auger segments are all attached, the auger defines at least one continuous flight. Auger segments with damaged or worn flight portions can be disposed of and replaced with new auger segments, or the auger segments can be refurbished for continued use.

The auger shaft typically includes a feature to prevent the auger segments from rotating relative to the auger shaft and to exert rotational force during the operation of the extrusion auger. A keyway in the auger shaft and a corresponding key or protrusion in the bore of the auger segment is one example of such a feature. A keyway can also orient the flight portions of the auger segments such that the cumulative flight(s) define a continuous surface.

Removal of the auger segments is often complicated by the process materials that pass between the auger segments during operation or by rust on the auger shaft and auger segments. The auger segments are removed axially and such debris and rust can complicate the removal of an auger segment by requiring additional force to overcome the debris, rust, or other impediments. In addition, some extruders provide limited access to the auger without major disassembly of the extruder. Thus the maintenance person who is removing the auger segments may have to pull the auger segments axially forward rather than pushing or prying the auger segments forward.

Auger segments do not have components that are inherently conducive to gripping and pulling. Gripping the flight portion results in asymmetric application of the removal forces, which increases the forces required to remove the auger segment. Since the worn flight surfaces are polished and curved they are hard to grip thus increasing the risk of injury to the maintenance personnel. Therefore, a need exists for a convenient, cost effective, and safe procedure for removing auger segments from an auger shaft without damaging the auger segments.

BRIEF SUMMARY OF THE INVENTION

The invention addresses the above needs and achieves other advantages by providing an extrusion auger that includes one or more auger segments that are removable with a pulling tool. At least one recess having an engaging surface is provided in a forward end of the auger segment, particularly in the auger hub that engages the auger shaft. An access way in the forward end allows a pulling tool to enter the recess and to contact an engaging surface in the recess. Advantageously, the pulling tool is able to engage the recess by way of a preexisting keyway on the shaft. By exerting a force on the pulling tool, the auger segment can be axially removed from the auger shaft.

In particular, the auger shaft includes a keyway and the auger segment includes a keyway protrusion that is positioned in the keyway of the auger shaft. The access way and recess may be axially located forward of the keyway protrusion such that the pulling tool may be advanced along the keyway and may be rotated such that a flanged end of the pulling tool passes through the access way to enter the recess so that it may contact the engaging surface of the auger segment. The engaging surface is generally perpendicular to the axis of the auger shaft. The auger segment may also include two or more recesses that are located symmetrically at diametrical positions.

A pulling tool for removing an auger segment from an auger shaft is also provided by the present invention. The pulling tool includes a flanged end at one end of a rod, wherein the flanged end extends radially beyond an outside surface of the rod. The pulling tool may contact the engaging surface of the auger segment to facilitate removal of the auger segment from the auger shaft. Advantageously, the contacting surface of the flanged end is generally perpendicular to the axis of the rod.

A method for removing an auger segment from an auger shaft is also provided. The pulling tool is advanced along the auger shaft and then the flanged end of the pulling tool is passed through the access way of the auger segment. The flanged end of the pulling tool contacts the engaging surface, and the pulling tool is pulled to remove the auger segment from the auger shaft. The method may also include rotating the pulling tool to pass the flanged end through the access way so that the flanged end is aligned with the engaging surface of the auger segment.

The extrusion auger and pulling tool of the present invention may be manufactured in a cost-effective manner with relative ease. The recess of the auger segment provides a convenient surface for gripping the auger segment with the pulling tool, wherein the surface has sufficient structural strength to allow removal without damage to the auger segment. The pulling tool may be conveniently used to exert the pulling forces necessary to overcome the resistance created by the process material, rust, and other impediments. Therefore, the extrusion auger and pulling tool of the present invention provide for convenient safe removal of auger segments.

BRIEF DESCRIPTION OF THE SEVERAL VIEWS OF THE DRAWINGS

Figure 1:
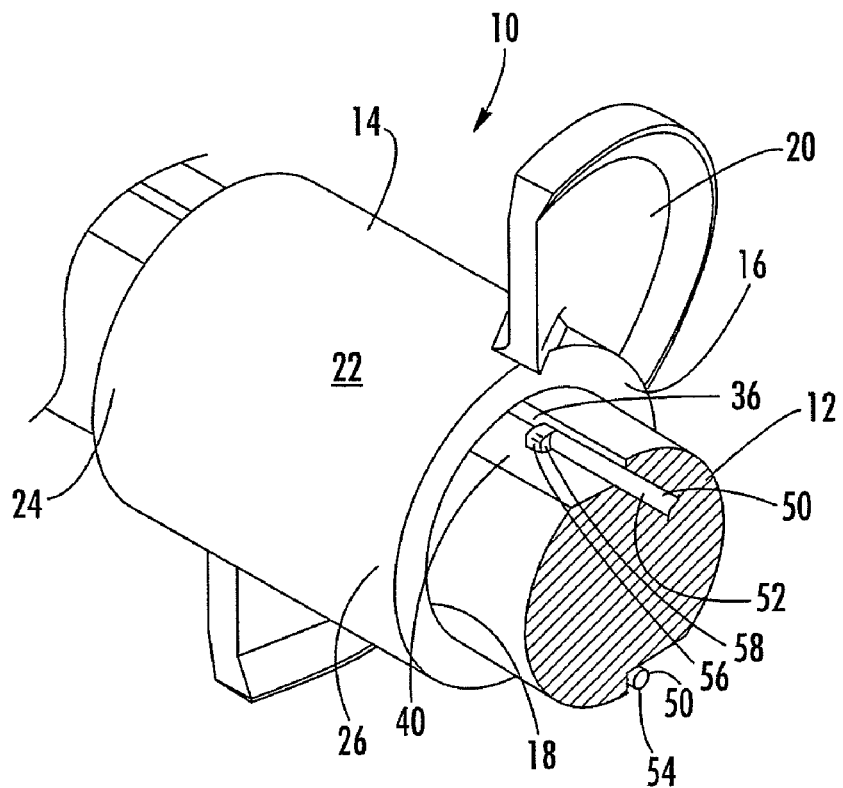
Figure 2:
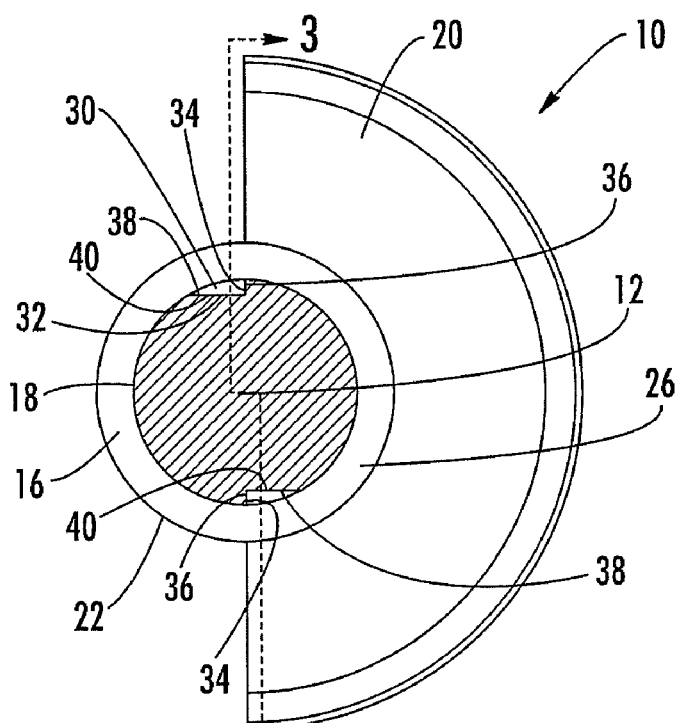
Figure 3:
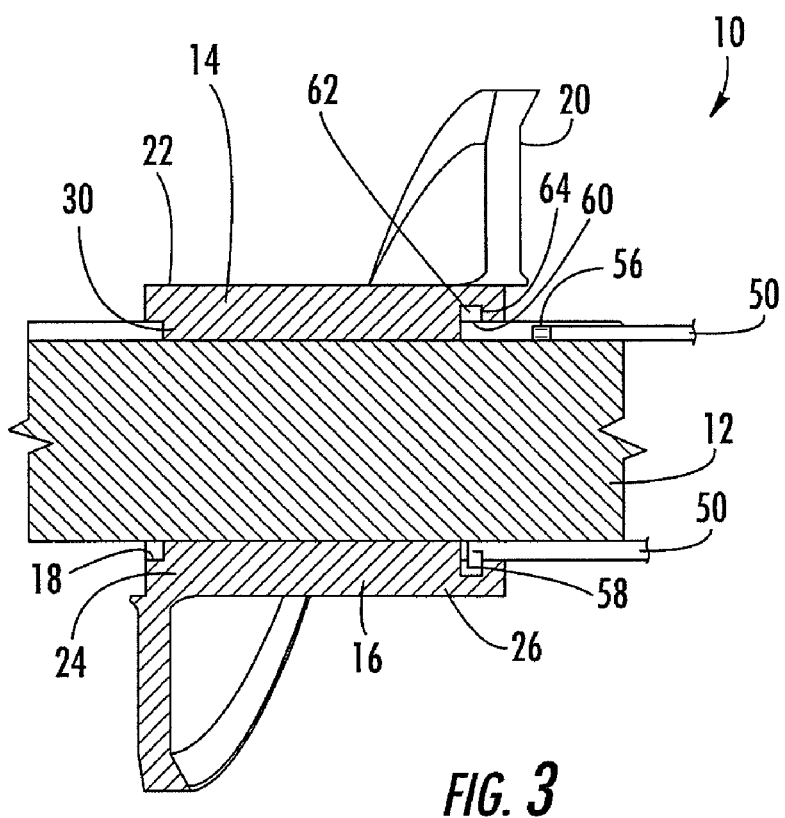
Figure 4:
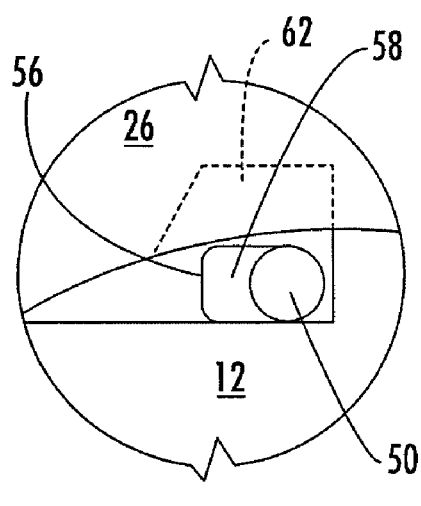
Figure 5:
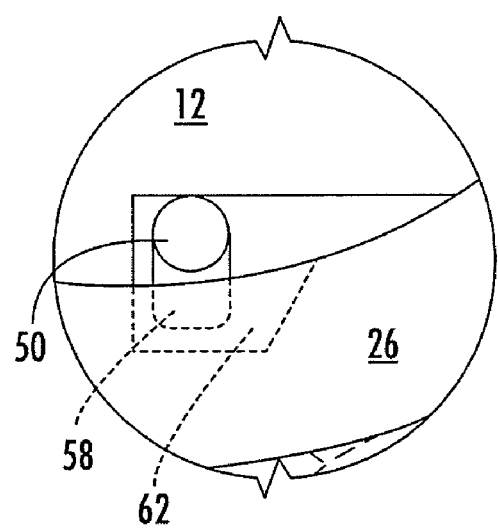
Figure 6:
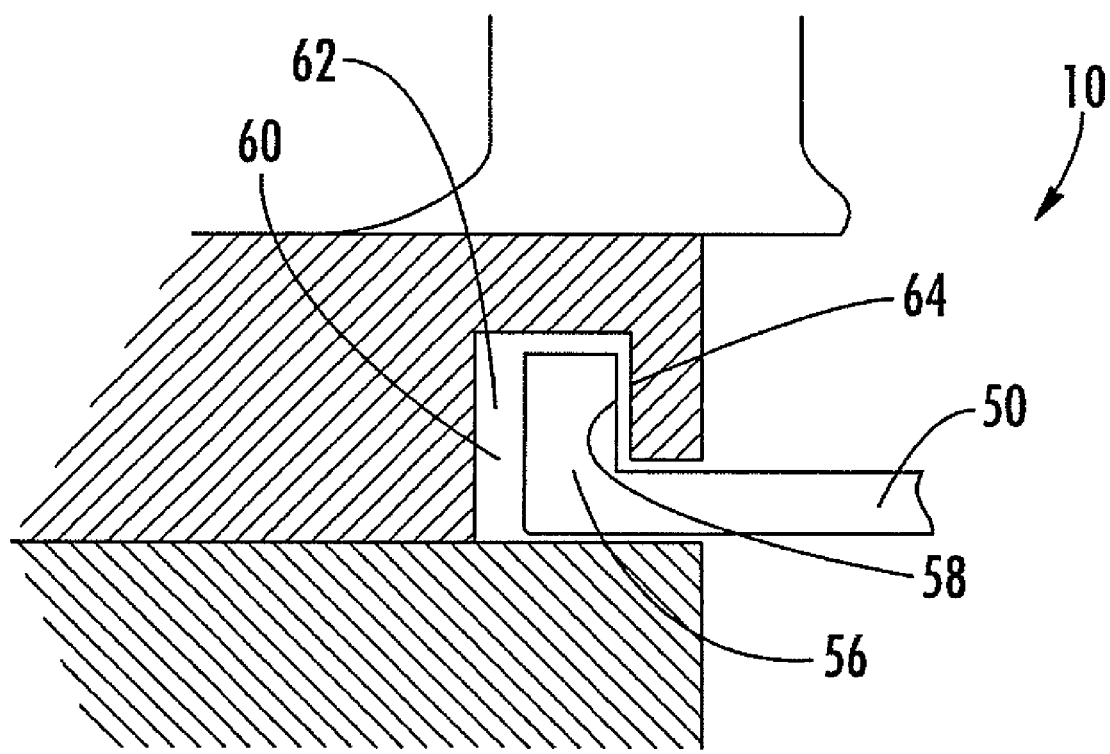

Having thus described the invention in general terms, reference will now be made to the accompanying drawings, which are not necessarily drawn to scale, and wherein:

FIG. 1 is a perspective view of an extrusion auger and pulling tool of the present invention, showing the pulling tool in the keyway of the auger shaft prior to the pulling tool contacting the auger segment;

FIG. 2 is an end elevation view of the forward end of the extrusion auger of FIG. 1;

FIG. 3 is a schematic, cross-sectional view taken along the line 3-3 of FIG. 2, showing a pulling tool on the top keyway prior to contacting the engaging surface of the auger segment and a pulling tool on the bottom keyway contacting the engaging surface of the auger segment;

FIG. 4 is an enlarged end view of the extrusion auger of FIG. 1, showing a pulling tool in the keyway of the auger shaft prior to rotating the flanged end into the recess of the auger segment;

FIG. 5 is an enlarged end view of the extrusion auger of FIG. 1, showing a pulling tool in the keyway of the auger shaft after rotating the flanged end into the recess of the auger segment; and FIG. 6 is an enlarged, cross-sectional view of the recess of the extrusion auger of FIG. 1, showing a pulling tool in the recess.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1-6, an extrusion auger 10 in accordance with one embodiment of the present invention is illustrated. The extrusion auger 10 includes an auger shaft 12 about which one or more auger segments are removably attached. An auger segment 14 has an auger hub 16 that includes an auger bore 18 that engages the auger shaft 12. At least a portion of a flight 20 is joined to the outer surface 22 of the auger hub 16. The one or more auger segments 14 can be axially attached to the auger shaft 12 such that the portions of a flight 20 are aligned to define a continuous flight. An extrusion auger of further embodiments may have two or more continuous flights such that the auger segments 14 include two or more discrete portions of a flight 20. For example, an extrusion auger having two continuous flights would include auger segments that have portions of a flight that are preferably separated by 180 degrees.

When assembling an extrusion auger 10 having one or more auger segments 14, the auger segments are axially attached to the auger shaft 12 such that an aft end 24 of a first auger segment 14 is positioned adjacent the aft end of the extrusion auger, and then a second auger segment 14 is axially advanced until the aft end 24 of the second auger segment engages a forward end 26 of the first auger segment. A third auger segment 14 is then axially advanced until the aft end 24 of the third auger segment engages a forward end 26 of the second auger segment and so forth until all the auger segments of the extension auger are attached. Sealants such as silicone or O-rings, to list two non-limiting examples, are preferably included between the engaging auger segments 14 to prevent or minimize the fine particles from the process material from contacting the auger shaft 12, which could inhibit the removal of an auger segment. The sealants also prevent the keyway of the auger shaft 12 from filling with constituents from the process material, which also inhibit the removal of the auger segment 14. The sealant may also prevent or minimize exposure of the auger shaft 12 to moisture that may create rust, which could further inhibit the removal of an auger segment.

The attached auger segments 14 are angularly oriented such that the portion of a flight 20 of a first auger segment engages the portion of a flight 20 of a second auger segment to define a continuous surface of the spiraled flight. The continuous surface of the flight improves the efficiency of the extrusion auger 10 while in operation and reduces the wear on the engaging surfaces of the flight portions 20 during operation of the extrusion auger. As shown in FIG. 2, an auger segment 14 may be angularly oriented using a keyway protrusion 30 that corresponds to, and may be positioned in, a keyway 32 in the auger shaft 12. The keyway protrusion 30 of the auger segment 14 includes a generally radial surface 34 that engages a keyway radial surface 36 of the keyway 32. The keyway 32 is further defined by a bottom surface 38 that intersects the radial surface 36. The engagements between the radial surfaces 34 and 36 provide angular orientation to the auger segments 14 and can allow rotational force from the auger shaft 12 to be exerted on the auger segment during operation of the extrusion auger.

FIG. 1 illustrates a pulling tool 50 of the present invention. The pulling tool 50 includes a rod 52 having a forward end (not shown) and defining an outside surface. The rod 52 of the pulling tool 50 may be of any length necessary to reach the auger segment 14 that is to be removed from the auger shaft 12. The rod 52 is preferably a cylindrical rod of high tensile steel, but the rod may be of any geometric shape or material suitable to remove an auger segment 14. The forward end may include a handle or other surface to facilitate gripping of the pulling tool 50 by an operator removing an auger segment 14.

The end of the pulling tool 50 opposite the forward end is a flanged end 56 that projects radially beyond the outside surface of the rod 52 on at least one side of the rod. The flanged end 56 defines a contacting surface 58 that may be used to contact the auger segment 14 to facilitate removal of the auger segment. The flanged end 56 may comprise an eccentric end having one projection or may comprise an end having two or more projections.

Referring to FIG. 3, the forward end 26 of the auger segment 14 includes an access way 60 that provides access to a recess 62 in the forward end. The access way 60 is an opening sufficiently sized for the flanged end 56 of the pulling tool 50 to pass through the access way and be axially located adjacent the recess 62. The access way 60 and recess 62 are preferably located radially inward of any sealant used between the auger segments 14 to prevent the ingress of the process material through the access way and into the recess.

The access way 60 and recess 62 of the auger segment 14 of FIGS. 1-6 are axially forward of the keyway protrusion 30. Therefore, the pulling tool 50 may be advanced along the keyway 32 of the auger shaft 12, as shown in the top keyway of FIG. 3, until the pulling tool is positioned directly below, or radially inward of, the access way 60 and then the flanged end 56 is rotated into the recess 62, as shown in the bottom keyway of FIG. 3. The pulling tool 50 may be advanced along the shaft 12 at any location in further embodiments of the extrusion auger 10.

The recess 62 is a hollow portion of the auger hub 16 that is radially located between the bore 18 and the outer surface 22 of the auger segment 14. The recess 62 may be of any cross-sectional configuration that would facilitate removal of the auger segment 14, and does not necessarily define an engaging surface 64 that extends purely radially, as is illustrated. The recess 62 defines an axial depth long enough to accommodate the flanged end 56 of the pulling tool 50 that will be used with the auger segment 14. The recess 62 also defines a radial depth sufficient to accommodate the flanged end 56 when the pulling tool 50 is rotated such that the contacting surface 58 is adjacent or contacts the engaging surface 64.

The axially forward surface of the recess 62 defines the engaging surface 64 which may be contacted by the contacting surface 58 of the pulling tool 50 for axial removal of the auger segment 14 in the forward direction. The axial distance of the auger hub 16 between the engaging surface 64 and a forward face of the auger segment 14 must be of sufficient thickness and structural strength to withstand the force required to remove an auger segment that will be exerted through the pulling tool 50 onto the engaging surface 64. The amount of force required to remove an auger segment 14 varies with the materials used for the auger shaft 12 and the auger segment 14, with the relative diameters of the auger shaft and the bore 18, with the weight of the auger segment, and with the amount of debris, rust, or other process materials that are located on or near the auger shaft.

The engaging surface 64 of FIG. 3 is one of the surfaces defining the recess 62; therefore, the engaging surface is also radially located between the bore 18 and the outer surface 22 of the auger hub 16. The engaging surface 64 is generally perpendicular to the axis of the auger shaft 12, though in further embodiments of the present invention the engaging surface may be oriented differently relative to the axis of the auger shaft. The engaging surface 64 preferably faces in a generally axial direction away from the forward end 26 of the auger hub to allow the pulling tool 50 to contact the engaging surface. Because the engaging surface 64 is defined in the forward end 26 of the auger hub 16, it axially faces the aft end 24 of the auger hub. The engaging surface 64 is contacted by the contacting surface 58 of the flanged end 56 of the pulling tool 50, and because the contacting surface is generally perpendicular to the axis of the rod, the contact between the contacting surface and the engaging surface is generally planar. After the flanged end 56 is positioned below the access way 60, as shown in FIG. 4, the pulling tool may be rotated approximately 90 degrees, as shown in FIG. 5, and pulled axially forward to contact the engaging surface 64. An alternative pulling tool may include a flanged end that is flexibly attached to the rod such that the flanged end is flexed toward the center of the rod as it passes through the access way 60 and returns to shape in the recess 62 to contact the engaging surface 64 without rotation of the pulling tool. Further embodiments of the pulling tool may contact the engaging surface 64 by additional techniques.

The auger segment 14 includes two recesses that are symmetrically located at diametrical positions, as shown in FIG. 3. To pull the auger segment 14 axially forward, a pulling tool 50 is preferably inserted into each recess, and each engaging surface 64 is contacted by the contacting surface 58 of each pulling tool 50. To remove the auger segment 14, a pulling force is applied to each pulling tool 50 such that the pulling forces are generally equivalent. The generally equivalent pulling forces preferably maintain the alignment of the auger segment 14 with the auger shaft 12 during removal to prevent or minimize binding or resistance to removal caused by a misaligned auger segment. Alternatively, an auger segment 14 may be removed with only one pulling tool 50 or with three or more pulling tools corresponding with three or more engaging surfaces 64. To attach the auger segments 14 to the auger shaft 12 prior to first use of the extrusion auger 10 or after the removal of auger segments, the auger segment may be axially pushed in the aft direction with any suitable tool, including, but not limited to, the flanged end 56 of the pulling tool 50.

The pulling tool of the present invention may be manufactured using any suitable process, including but not limited to extrusion, welding, or forging, and using any suitable material, including but not limited to high tensile steel. To manufacture the auger segments of the present invention to include the access ways and recesses, materials and manufacturing processes known in the art may be utilized. The access ways and recesses of the various embodiments may be included in the molds used to cast the auger segments, or the access ways and recesses may be machined into the auger segments subsequent to casting or forging of the auger segments.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An extrusion auger apparatus, comprising:
an auger shaft having an axis;
a pulling tool having a flanged end; and
at least one auger segment, comprising:
an auger hub defining a bore configured to engage the auger shaft along the axis thereof and an outer surface opposite the bore, wherein the auger hub defines a forward end and an opposed rearward end;
at least a portion of a flight joined to the outer surface of the auger hub; and
at least one recess defined by the auger hub between the forward and rearward ends thereof and extending radially from the bore toward the outer surface, the at least one recess having an engaging surface facing in a generally axial direction away from the forward end of the auger hub and a side surface disposed generally perpendicularly to the engaging surface, the engaging surface being configured to be engagable by the flanged end of the pulling tool, and the side surface being configured to be engagable by the pulling tool to prevent movement thereof around the auger hub, whereby an axial force exerted on the pulling tool outwardly of the auger hub from the forward end pulls the at least one auger segment along the axis of the auger shaft to facilitate removal of the at least one auger segment from the auger shaft.

2. An apparatus according to claim 1, wherein the auger shaft defines an axially-extending keyway, and the auger hub includes at least one keyway protrusion extending radially inward of the bore, the at least one keyway protrusion of the auger hub being configured to engage the keyway of the auger shaft.

3. An apparatus according to claim 2, wherein the engaging surface is axially disposed between the keyway protrusion and the forward end.

4. An apparatus according to claim 2, wherein the keyway protrusion includes a radial surface and a bottom surface.

5. An apparatus according to claim 1, wherein the engaging surface is generally perpendicular to the axis of the auger shaft.

6. An apparatus according to claim 1, wherein the auger hub includes two recesses disposed at diametrically-opposed positions.

7. A method of removing an auger segment from an auger shaft of an extrusion auger, in a forward direction along an axis of the auger shaft, the auger segment including an auger hub defining a bore configured to engage the auger shaft along the axis thereof and an outer surface opposite the bore, wherein the auger hub defines a forward end facing in the forward direction and an opposed rearward end, and at least one recess between the forward and rearward ends thereof, the at least one recess extending radially from the bore toward the outer surface, and having an engaging surface facing in a generally axial direction away from the forward end of the auger hub, the method comprising:

advancing a flanged end of a rod member of a pulling tool from the forward end of the auger hub along an axially-extending access way defined between the auger shaft and the auger hub, the rod member defining an axis, having a radially outer surface, and including a flange operably engaged with the flanged end thereof and extending radially outward of the outer surface;

inserting the flange into the at least one recess such that the flange engages the engaging surface; and exerting an axial force on the rod member in the forward direction so as to pull the auger segment axially along the auger shaft to facilitate removal of the auger segment from the auger shaft in the forward direction.

8. A method according to claim 7, wherein inserting the flange into the at least one recess further comprises rotating the rod member of the pulling tool about the axis thereof to pass the flanged end through the access way, and then rotating the pulling tool about the axis thereof to insert the flange into the at least one recess.

9. A method according to claim 7, wherein advancing the flanged end of the rod member further comprises advancing the flanged end of a rod member of the pulling tool from the forward end of the auger hub along an axially-extending access way comprising a keyway defined by the auger shaft.

\* \* \* \* \*